(12) United States Patent
Highgate

(10) Patent No.: US 8,647,494 B2
(45) Date of Patent: Feb. 11, 2014

(54) WATER MANAGEMENT AND COOLING DURING ELECTROLYSIS

(75) Inventor: Donald James Highgate, Surrey (GB)

(73) Assignee: ITM Power (Research) Ltd., South Yorkshire (GB)

( * ) Notice: Subject to any disclaimer, the term of this patent is extended or adjusted under 35 U.S.C. 154(b) by 658 days.

(21) Appl. No.: 12/864,186

(22) PCT Filed: Jan. 23, 2009

(86) PCT No.: PCT/GB2009/000197
§ 371 (c)(1),
(2), (4) Date: Jul. 22, 2010

(87) PCT Pub. No.: WO2009/093042
PCT Pub. Date: Jul. 30, 2009

(65) Prior Publication Data
US 2010/0288647 A1  Nov. 18, 2010

(30) Foreign Application Priority Data
Jan. 24, 2008 (GB) .................................. 0801268.4

(51) Int. Cl.
*C25B 1/10* (2006.01)
(52) U.S. Cl.
USPC ...................................... 205/628; 204/275.1

(58) Field of Classification Search
USPC ......................................... 204/275.1; 205/628
See application file for complete search history.

(56) References Cited

U.S. PATENT DOCUMENTS

| 5,296,109 | A | * | 3/1994 | Carlson et al. | 205/628 |
| 2003/0196893 | A1 | | 10/2003 | McElroy | |
| 2007/0138022 | A1 | * | 6/2007 | Peter et al. | 205/628 |

FOREIGN PATENT DOCUMENTS

| EP | 0583215 | 2/1994 |
| WO | WO 2005/060018 | 6/2005 |
| WO | WO 2007048997 A2 * | 5/2007 |

* cited by examiner

*Primary Examiner* — Nicholas A Smith
(74) *Attorney, Agent, or Firm* — Saliwanchik, Lloyd & Eisenschenk

(57) ABSTRACT

A method of electrolysing water, using a water electrolyser having cathode and anode compartments respectively on either side of a hydrophilic polymer cation-exchange membrane, the method comprising: (i) adding water to the anode compartment only, such that the cathode compartment is predominantly free of water in liquid form; (ii) electrolysing the water to form hydrogen gas in the cathode compartment and oxygen gas in the anode compartment; and (iii) re-circulating the hydrogen gas through the cathode compartment.

8 Claims, 1 Drawing Sheet

'Single–Sided Hydration' System

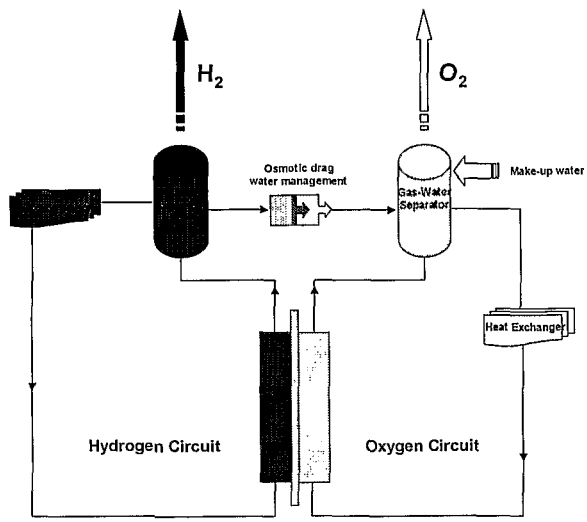
Figure 1  Conventional Balance of Plant
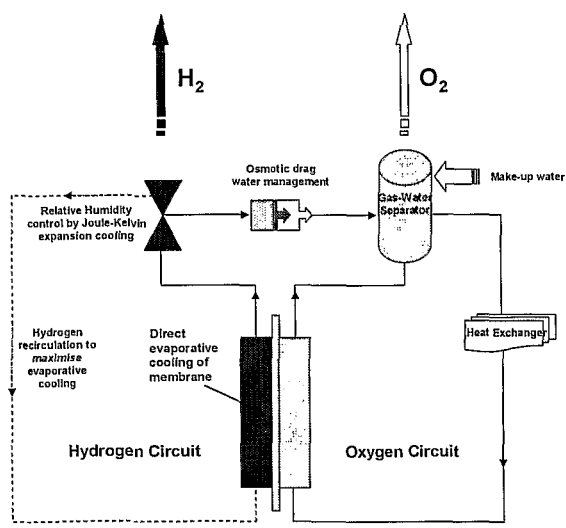
Figure 2  'Single-Sided Hydration' System

WATER MANAGEMENT AND COOLING DURING ELECTROLYSIS

CROSS REFERENCE TO A RELATED APPLICATION

This application is a National Stage Application of International Application Number PCT/GB2009/000197, filed Jan. 23, 2009; which claims priority to Great Britain Application No. 0801268.4, filed Jan. 24, 2008; which are incorporated herein by reference in their entirety.

FIELD OF THE INVENTION

The present invention relates to water management and methods of cooling during electrolysis. It also relates to electrolyser systems for use in such methods.

BACKGROUND OF THE INVENTION

Conventional solid polymer electrolysers operate using a proton exchange membrane (PEM). The membrane is in contact with a catalyst and electrode on each surface and the resulting membrane electrode assembly (MEA) is arranged as the separator between two chambers.

The chambers are normally filled with water and, when a voltage is applied to the electrodes, the water is dissociated to form a hydronium ion ($H^+$) and a free oxygen ion ($O^-$). Electrons entering the system from the external circuit facilitate the production of atomic oxygen (O) and thus molecular oxygen ($O_2$), as bubbles in the water on the 'oxygen' side of the apparatus. The hydronium ion passes through the membrane to the 'hydrogen' chamber where it first forms, atomic hydrogen (H) and then molecular hydrogen ($H_2$), which appears as bubbles in the water in the hydrogen chamber.

Water is necessary to ensure the continued operation of polymer membranes, as they lose ionic conductivity if they dry out. It is particularly necessary to have water present at the anode, as water is needed to form the oxygen ions, and thus oxygen gas.

An example of a conventional membrane is Nafion. Nafion has a relatively low water permeability, and therefore operates best when water is applied to both sides of the membrane.

The equipment needed to maintain the operation of an electrolyser is termed the "balance of plant" (BoP) and can represent a considerable fraction of the total cost of an electrolyser system. In a conventional system (FIG. 1), there are a number of necessary elements including:

(a) a water-gas separation tower connected to each electrode compartment;
(b) a heat exchanger connected to each electrode compartment;
(c) a water make-up system into the oxygen electrode compartment; and
(d) a water return system from the hydrogen electrode to the oxygen electrode, for water transferred by electro-osmotic drag.

All the above items must be pressure tested to the full operational pressure of the system and, in addition to the cost, the parasitic energy demand inherent in the pumping and circulation is high.

Some electrolysers may be inefficient, which can lead to the generation of heat. This can cause chemical and/or mechanical instability in the membrane. It is therefore necessary to ensure that there is an efficient cooling system in electrolysers.

WO03/023890 discloses hydrophilic polymer ion-exchange membranes. These membranes have increased water permeability and maintain hydration even in environments where little water is available.

WO2007/105004 discloses the use of composite hydrophilic polymer ion-exchange membranes in electrolysers. A method of electrolysis is disclosed, in which the hydrogen side of the membrane is predominantly free of water in liquid form. The membrane used in this method is a cationic exchange (CE) membrane.

WO2009/007691 discloses the electrolysis of seawater using hydrophilic membranes. The electrolysis of seawater using CE system with a dry cathode is disclosed.

SUMMARY OF THE INVENTION

It has surprisingly been found that the cooling in the known one-sided CE electrolysers can be improved by re-circulating hydrogen in the dry electrode compartment (cathode). When re-circulated, hydrogen acts as a coolant, which improves evaporative cooling from the hydrogen side of the membrane. The advantages of this are that the need for expensive heat exchanger cooling systems is minimised.

According to a first aspect, the present invention is therefore a method of electrolysing water, using a water electrolyser having cathode and anode compartments respectively on either side of a hydrophilic polymer cation-exchange membrane, the method comprising:

(i) adding water to the anode compartment only, such that the cathode compartment is predominantly free of water in liquid form;
(ii) electrolysing the water to form hydrogen gas in the cathode compartment and oxygen gas in the anode compartment; and
(iii) re-circulating the hydrogen gas through the cathode compartment.

Further, it has been found that, in hydrophilic CE systems, hydration can be maintained when water is added to the cathode (where hydrogen is formed) only. This is surprising as it was previously deemed necessary to have water in the anode (oxygen) compartment. Due to the hydrophilic properties of the membrane, enough water is present at the anode side of the membrane to form the necessary oxygen ions. Another advantage of this particular one-sided operation is that cooling is effected by evaporation of water from the membrane into the dry electrode compartment.

According to a second aspect, the present invention is therefore a method of electrolysing water, using a CE water electrolyser as defined above, the method comprising:

(i) adding water to the cathode compartment, such that the anode compartment is predominantly free of water in liquid form;
(ii) electrolysing the water to form hydrogen gas at the cathode and oxygen gas at the anode.

It has also surprisingly been found that, by using an electrolyser having a hydrophilic anionic exchange (AE) membrane, hydration can be maintained even if water is supplied to one side of the membrane only. AE membranes have a number of advantages over CE membranes, such as the potential for cheaper catalysts and reduced catalyst degradation.

According to a third aspect, the present invention is therefore a method of electrolysing water, using a water electrolyser having anode and cathode compartments respectively on either side of a hydrophilic polymer anion-exchange membrane, the method comprising:

(i) adding water to only one of the anode and cathode compartments, such that the other compartment is predominantly free of water in liquid form; and (ii) electrolysing the water to form hydrogen gas in the cathode compartment, and oxygen gas in the anode compartment.

According to a fourth aspect, the present invention is an electrolyser system comprising a water electrolyser having an AE membrane as defined above, wherein only one of the anode and cathode compartments is connected to means for pumping water through said electrode compartment.

According to a fifth aspect, the present invention is an electrolyser system comprising a water electrolyser having a CE membrane as defined above, wherein only the cathode is connected to the water pumping means.

DESCRIPTION OF PREFERRED EMBODIMENTS

Hydrophilic polymer ion-exchange membranes are known in the art. They may be prepared as described in WO03/023890, the contents of which are incorporated herein by reference. WO03/023890 describes how a hydrophilic membrane material can be made by cross-linking a hydrophobic monomer with a hydrophobic co-monomer and a highly ionic monomer to form an intrinsically ionic polymer of high water uptake. Such materials are distinguished both by high effective ionic conductivity and by a high value of water permeability.

CE and AE hydrophilic membranes are also known to those skilled in the art. AE membranes are disclosed in WO2005/080018, the contents of which are incorporated herein by reference.

In a method of the invention, water is added to one electrode compartment only, such that the other electrode compartment is predominantly free of water in liquid form, i.e. dry. During electrolysis, it is possible that some water will enter the other electrode compartment due to osmotic drag. However, this is a minor amount of water compared to that present in the first electrode compartment.

In one embodiment, the membrane is an AE membrane. In such an embodiment, one of either the anode or the cathode is predominantly free of water in liquid form.

In a preferred embodiment of the method of the invention relating to AE membranes, the gas that is formed in the electrode compartment that is dry is re-circulated through that dry electrode compartment. This may greatly improve evaporative cooling.

In one embodiment, the membrane is a CE membrane. In such an embodiment, it is preferred that the water is supplied to the cathode, while the anode is dry. A hydrophilic membrane may contain enough water on the anode side, such that it can react to form oxygen in the substantially dry anode.

It is a particularly preferred embodiment of the invention that the hydrophilic membrane is formed by co-polymerising a hydrophilic monomer and a hydrophobic monomer in the presence of water and a strongly ionic group. Membranes of this type are particularly hydrophilic and particularly effective at maintaining hydration.

In a preferred embodiment, the gas formed in the dry electrode compartment is re-circulated through a gas cooling apparatus. Suitable devices are known to those skilled in the art. The gas cooling apparatus may be a Joule-Kelvin expansion cooling system. This device is also well known in the art, and decreases the temperature of the gas passing through it by expansion.

In another preferred embodiment, the dry side gas may be circulated through drying apparatus, to remove any water that has entered the hydrogen electrode compartment by osmotic drag. Suitable drying apparatus is well known to those skilled in the art.

Means for pumping water are also known to those skilled in the art.

In a preferred embodiment, an electrolyser system includes valves to prevent back flow of water. If a gas drier is present in the system, a valve is connected to the output of the gas drier, such that water cannot flow back into the dry electrode compartment.

In a further preferred embodiment, only the electrode to which water is supplied is connected to a water heat exchanger. This is a device that removes heat from water, thereby reducing its temperature.

In one embodiment, an electrolyser system is set up as shown in FIG. 2. As the hydrogen electrode is dry, there is no need for an expensive water circulation pump in the hydrogen circuit. Instead, the only pump present in the hydrogen circuit is a much cheaper gas pump, which re-circulates the hydrogen gas. The hydrogen gas acts as a coolant, and maximises evaporative cooling of water from the membrane. In this embodiment, the hydrogen electrode is also connected to a Joule-Kelvin expansion cooling system. This further increases cooling of the hydrogen. This device is well known in the art, and decreases the temperature of the gas by expansion. In this embodiment, no water heat exchanger is present on the hydrogen side, as the hydrogen circuit is predominantly free of water.

In an electrolyser, the oxygen and the hydrogen are normally produced at the same (or closely similar) pressures. In many situations however, the hydrogen is required at high pressure for storage while the oxygen is used at low pressure or released to atmosphere depending upon the application. In the case where the oxygen is not required to be stored at high pressure, the oxygen may be passed through a pressure reduction valve, which reduces the temperature of the gas and provides a 'cold spot'. A 'cold spot' can in turn be used to provide temperature control of the hydrogen flow.

The following example illustrates the invention.

EXAMPLE

An experiment was conducted to determine the effect of hydrogen re-circulation in a one-sided water electrolyser. Two sets of apparatus were used:

(1) A one-sided electrolyser with water absent on the $H_2$ side of the system (ignoring water present due to osmotic drag). Hydrogen flows at a rate governed by Faraday's first law of electrolysis after being formed at the cathode.

(2) A one-sided electrolyser with water absent on the $H_2$ side. $H_2$ is re-circulated around the $H_2$ side of the cell once it is formed at the cathode. The flow-rate is governed by an external gas pump.

The equipment used on the $H_2$ side of the system included a peristaltic pump and the electrolyser. In the second apparatus, a drier tower was included to remove water present in the $H_2$ due to osmotic drag. The water on the $O_2$ side of the system was pumped via an electrolyser testing rig. A manual pump (operating at 150 ml/min flow) re-circulated the hydrogen around the $H_2$ side of the system. One-way ball valves were included in the circuit to prevent back flow of water to parts of the system, such as directly after the output of the gas drier.

50 A of current was applied to the electrolyser (circular cell design) for a duration of one hour. Two temperature probes were put in the system, one placed at the centre of the $H_2$ side of the cell of the electrolyser ($T_A$) and the other placed directly after the output of the cell ($T_B$). The voltage and temperatures $T_A$ and $T_B$ were recorded (the temperatures being recorded every 5 minutes).

The flow of heat via the cooling medium was established by measuring the temperature of the cells at points A and B. With hydrogen circulating around the cell, the temperature of the membrane point ($T_A$) equilibrated at below 40° C. after approximately 45 minutes. Without hydrogen circulation (apparatus 1), the system took 1 hour to equilibrate and reached 42° C. This equilibrium point shows that the hydrogen circulation is able to perform effective cooling.

The invention claimed is:

1. A method of electrolysing water, using a water electrolyser having cathode and anode compartments respectively on either side of a hydrophilic polymer cation-exchange membrane, the method comprising:
   (i) adding water to the anode compartment only, such that the cathode compartment is predominantly free of water in liquid form;
   (ii) electrolysing the water to form hydrogen gas in the cathode compartment and oxygen gas in the anode compartment; and
   (iii) re-circulating the hydrogen gas through the cathode compartment.

2. The method according to claim 1, wherein in between steps (ii) and (iii), the hydrogen is passed though drying apparatus and/or gas cooling apparatus.

3. A method of electrolysing water, using a water electrolyser, having cathode and anode compartments respectively on either side of a hydrophilic polymer cation-exchange membrane, the method comprising:
   (i) adding water to the cathode compartment, such that the anode compartment is predominantly free of water in liquid form;
   (ii) electrolysing the water to form hydrogen gas at the cathode and oxygen gas at the anode; and
   (iii) re-circulating the oxygen gas through the anode compartment.

4. The method according to claim 3, wherein in between steps (ii) and (iii) the oxygen is passed through drying apparatus and/or gas cooling apparatus.

5. A method of electrolysing water, using a water electrolyser having anode and cathode compartments respectively on either side of a hydrophilic polymer anion-exchange membrane, the method comprising:
   (i) adding water to only one of the anode and cathode compartments, such that the other compartment is predominantly free of water in liquid form;
   (ii) electrolysing the water to form hydrogen gas in the cathode compartment, and oxygen gas in the anode compartment; and
   (iii) recirculating the gas that is produced in the other electrode compartment through said compartment.

6. The method according to claim 5, wherein water is added to the cathode compartment only.

7. The method according to claim 5, wherein the water is added to the anode compartment only.

8. The method according to claim 5, wherein in between steps (ii) and (iii), the gas that is produced in the other compartment is passed through drying apparatus and/or gas cooling apparatus.

* * * * *